| United States Patent [19] | [11] 3,847,474 |
|---|---|
| Uterhart | [45] Nov. 12, 1974 |

[54] ELECTRICAL CAMERA FOCUSING MECHANISM

[75] Inventor: Philip E. Uterhart, Park Ridge, Ill.

[73] Assignee: Bell & Howell Company, Chicago, Ill.

[22] Filed: Jan. 19, 1973

[21] Appl. No.: 324,928

[52] U.S. Cl. ................ 354/168, 354/195, 352/140
[51] Int. Cl. .......................................... G03b 13/20
[58] Field of Search ............. 95/44 R, 45; 240/2 S; 352/140, 139; 33/71; 354/195–201, 162–169

[56] References Cited
UNITED STATES PATENTS

| 2,485,429 | 10/1949 | Burchard | 240/2 S |
| 3,538,830 | 11/1970 | Henrikson | 95/44 R |
| 3,538,831 | 11/1970 | Mueller | 95/44 R |
| 3,538,833 | 11/1970 | Koeber, Jr. | 95/44 R |
| 3,613,544 | 10/1971 | Plihal et al. | 95/45 |
| 3,616,539 | 11/1971 | Carlson | 33/71 |
| 3,678,836 | 7/1972 | Dietz | 95/45 |

Primary Examiner—Samuel S. Matthews
Assistant Examiner—E. M. O'Connor
Attorney, Agent, or Firm—John R. Hoffman; John E. Peale, Jr.

[57] ABSTRACT

A distance determining mechanism for a camera or other optical instrument having a focusable objective. The mechanism includes a mercury switch which is mounted so that it closes by gravity when the camera is tilted, to cause adjustment of the objective into focus on a remote subject. The distance is determined by triangulation based on orientation of the mercury within the tube portion of the switch in relation to electrical contacts mounted within the tube portion upon alignment of the axis of the objective with the base of the remote subject. The objective is adjusted by a motor for a time determined by a control circuit responding to restoration of the mercury switch to circuit open position while simultaneously driving the objective of the camera to focused condition.

3 Claims, 4 Drawing Figures

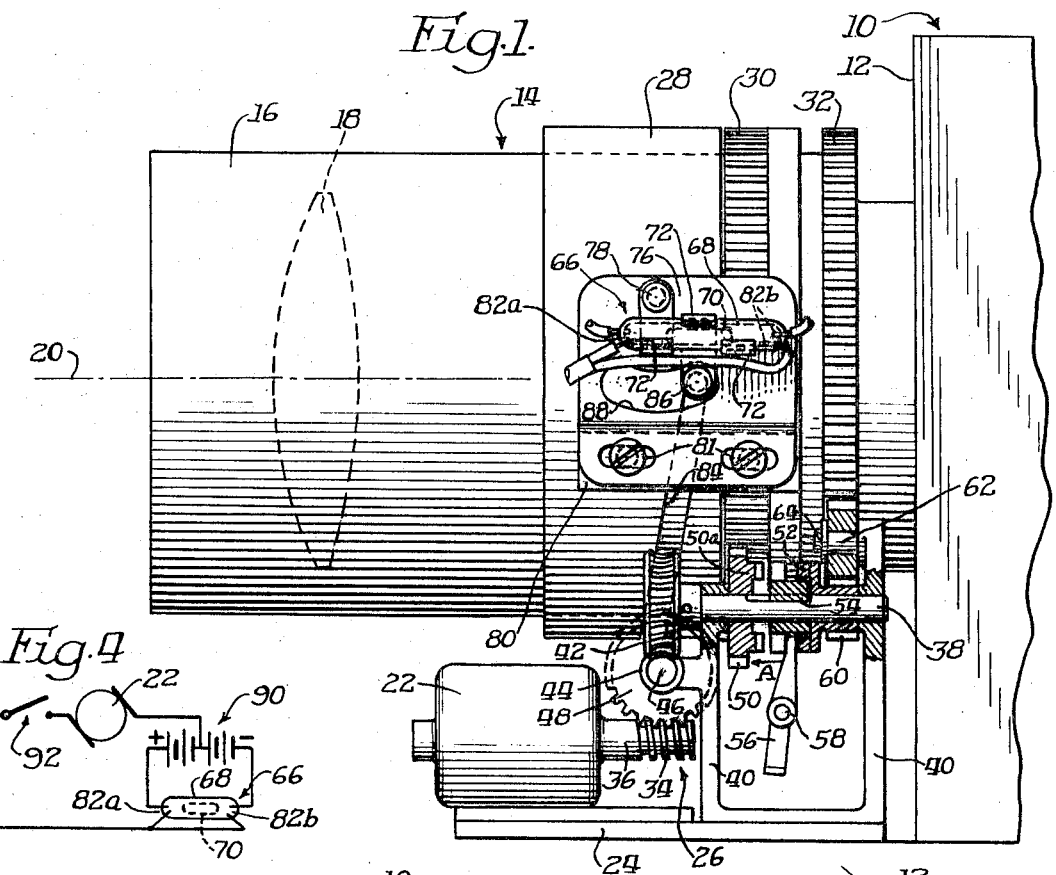
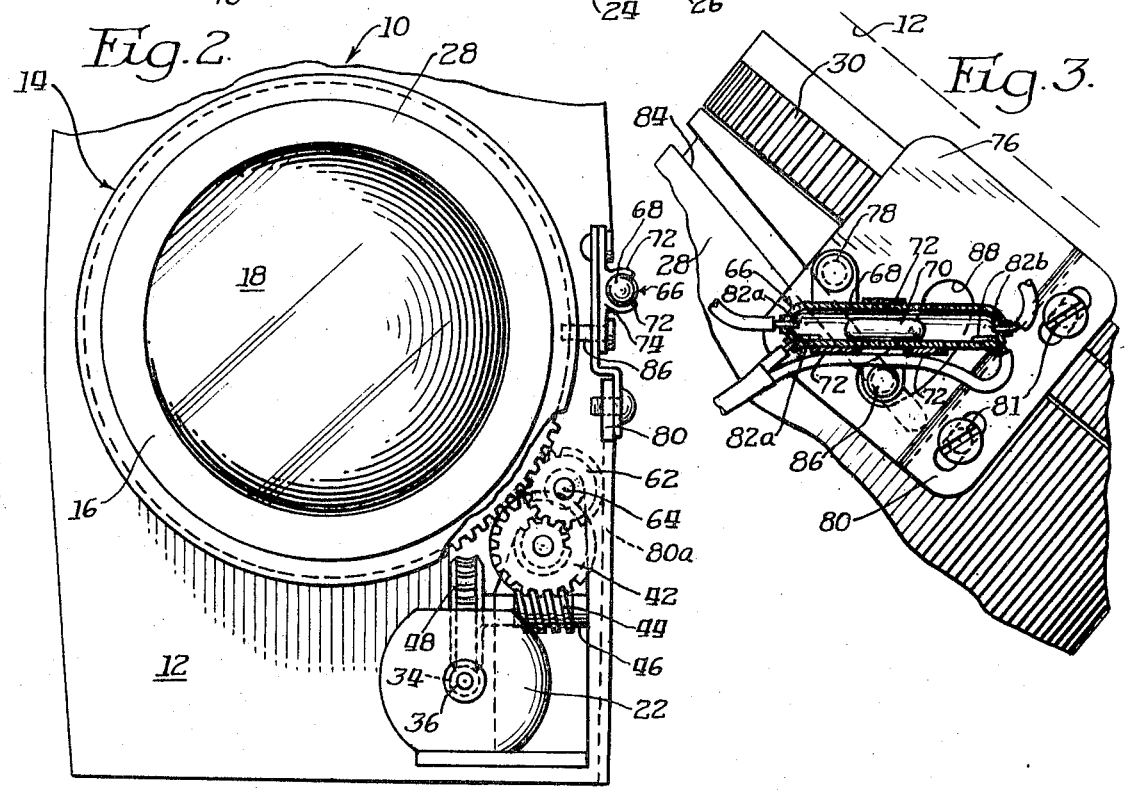

3,847,474

ELECTRICAL CAMERA FOCUSING MECHANISM

BACKGROUND AND SUMMARY OF THE INVENTION

This invention relates to optical instruments, such as cameras and the like, and particularly to focusing mechanism therefor.

The invention relates particularly to a focusing mechanism for adjusting a focusable objective lens assembly in response to focal distances determined by a range finding device functioning on the principle of triangulation. The lens assembly is adjusted by a motor in a control circuit responsive to the orientation of a gravity influenced electrical contact switch means.

The triangulation principle relates to the computation of the length of one side of a right triangle, namely the camera-to-subject distance. To compute the distance, the height of either the vertical side or the length of the hypotenuse of the triangle, and one of the angles other than the right angle must be known. For use of the principle in a camera focusing arrangement, the length of the vertical side of the triangle must be determined as the height of an average adult above the supporting plane on which the person stands. Thus, the vertical side will be approximately the same in most uses to which a camera is put. By having the user align the base of a remote subject with a reference mark in the viewfinder of the camera, the camera is caused to be angled by determinable amounts. That is, the user views the subject at the point where a vertical line through the subject intersects the supporting plane. The optical axis of the camera's lens may be repeatably angled at a given angle relative to both the vertical side and the base side of the triangle. Hence, the required values necessary to compute the unknown length of the base line are available.

Attempts have been made to eliminate the need for mathematical computation by the user by providing a mechanism which functions to focus the lens on a semi-automatic basis. U.S. Pat. 3,538,830 and 3,538,831 to Henriksen and Mueller, respectively, both of which are dated Nov. 10, 1970 and assigned to the assignee of the present invention, show pendulous range finders for determining the distance between a camera and a subject (the focal distance). These patents enunciate the principles of mechanical triangulation and are incorporated by reference herein. Both patents show means by which a pendulous rangefinder can be employed in a camera for fixing the position of an objective in an "in focus" condition. The pendulous member of the rangefinder swings to an angular aspect relative to an objective lens assembly and corresponding to focal distance. The rangefinder is then locked by manual operation of mechanical means. The objective lens is then moved by direct manually applied torque to a predetermined distance from the rangefinder at which the objective lens is "in focus".

In the U.S. Pat. No. 3,538,831, a pendulous member is arranged for swinging movement relative to the body of a camera having an objective lens assembly which is arranged from the body for focusing adjustment. The pendulous member is swingable between a first position in which the objective lens is conditioned "in focus" and a second position in which the objective lens is in an unfocused condition. Motive means responsive to the pendulous member when in the second position are provided for driving the objective lens toward an "in focus" position and the pendulous member toward the first position. The pendulous member preferably is electrically conductive to close a circuit with conductive contacts for operating the motive means.

The present invention is directed to providing a focusing mechanism for a camera or the like which, in its broadest sense, similarly uses the principles of gravity operation to effect focusing of the lens on a triangulation concept. More particularly, the focusing mechanism of the present invention employs a pivotally mounted mercury switch which is rotated during focusing of the camera to provide new and improved, more positive electrical contact means.

It is, therefore, an object of the present invention to provide a new and improved focusing mechanism for a camera with an adjustable objective lens.

It is another object of the invention to provide a camera with a mechanism of the character described which is exceedingly reliable and easy to use.

A further object of the invention is to provide a focusing mechanism of the character described which is gravity responsive and minimizes the procedure for focusing the adjustable objective lens of a camera by triangulation.

In the exemplary embodiment of the invention, a mercury switch is mounted on the side of a housing for the camera which supports its focusable objective lens assembly. The tubular portion of the mercury switch extends or is elongated in a plane generally parallel to the axis of the objective lens assembly. The tubular portion of the mercury switch extends or is elongated in a plane generally parallel to the axis of the objective lens assembly. The tubular portion is pivotally movable relative to the housing for the lens assembly about an axis generally perpendicular to the objective axis. When the camera is tilted to focus in on the base of the remote subject, the mercury switch correspondingly is tilted to circuit closure condition to actuate motive means which is operative during circuit closure for driving the objective lens assembly to focusing condition. As the lens is focused, the mercury switch is driven back to a horizontal orientation (while the lens is still directed toward the base of the subject). When the mercury switch reaches its horizontal position, circuit breaking condition is established for de-energizing the motive means when the lens assembly is in proper focused condition. Movement of the mercury switch is accomplished by a pin and slot arrangement between the tubular portion of the switch and the focusing ring of the lens assembly.

Preferably, the motive means is reversibly driven and contact means is provided at opposite ends of the tube portion of the mercury switch for circuit closure by the mercury within the tube for reversibly driving the motive means.

Other objects, features and advantages of the invention will be apparent from the following detailed description taken in connection with the accompanying drawings.

DESCRIPTION OF THE DRAWINGS

FIG. 1 is a side elevational view of the front of a camera, or the like, showing the objective lens assembly, focusing mechanism, and other components of the present invention;

FIG. 2 is a broken away front elevational view looking from left to right in FIG. 1;

FIG. 3 is a broken away elevational view of the mercury switch and related components shown in FIG. 1, with the objective lens assembly tilted downwardly and the focusing ring portion thereof rotated through a portion of one revolution; and FIG. 4 is a circuit diagram showing generally the wiring between the mercury switch, batteries, and motor for the focusing mechanism of the present invention.

DETAILED DESCRIPTION OF THE INVENTION

Referring to the drawings in greater detail, there is shown an optical instrument such as a camera, generally designated 10, comprising a housing having a front wall 12 for supporting a focusable objective or lens assembly, generally designated 14. The lens assembly 14 includes a lens barrel 16 which has secured therein an objective lens 18 which is adjustable with the lens assembly longitudinally of the optical axis of the objective lens as the assembly is rotated. Thereby, objective lens 18 may be moved to an "in focus" condition, i.e., the focal plane of objective lens 18 may be brought into coincidence with the film plane of camera 10. Because the position of the film and other related components of the camera will be readily recognized by those skilled in the art, they have been omitted from the drawings.

To adjust the objective lens assembly 14, according to the present invention, motive means in the form of a small DC motor 22 is mounted on a hanger bracket 24 which is rigidly secured to the front wall 12 of the camera. A power transmission in the form of a gear assembly, generally designated 26, transmits motor torque to a focusing ring 28 which has a gear ring portion 30 included in or connected to the objective lens assembly 14. Positioned behind the focusing ring 28 and the gear ring portion 30 thereof is a zoom gear ring 32 which, as described below, also may be selectively operated by the motor 22.

The gear assembly 26 which defines the power transmission comprises a worm screw or gear 34 mounted on an output shaft 36 of motor 22. The opposite ends of another shaft 38 are journalled in a pair of spaced apart arms 40 which form an upwardly protruding extension of the hanger bracket 24. The arrangement of arms 40 is such that shaft 38 is disposed generally parallel to the motor output shaft 36 and rigidly supports a worm wheel 42 spaced above the worm screw 34 of the motor shaft. Worm wheel 42 is in operable mesh with a worm screw or gear portion 44 (FIG. 2) of another shaft 46 which has a worm or gear wheel 48 fixed thereto. Worm wheel 48 is in operable mesh with the worm screw 34 of the motor output shaft 36. The shaft 46 for the worm screw portion 44 and the worm wheel 48 extends generally transversely of the output shaft 36 and the shaft 38 for transmitting the torque of the motor to the shaft 38.

Another gear member 50 is loosely journalled on shaft 38 in driving association with the gear ring portion 32 of the focusing ring 28. Gear member 50 has a face gear portion 50a for selective clutching meshed engagement with a face gear 52 keyed, as at 54, to shaft 38. A lever member 56 is pivoted intermediate its ends, as at 58, for selectively moving face gear 52 to the left (as viewed in FIG. 1), in the direction of arrow A, into meshed engagement with the face gear portion 50a of gear member 50 to selectively transmit torque from the motor 22 to the gear ring portion 30 for rotating the focusing ring 28. Lever 56 may be moved so as to slide gear member 52 opposite the direction of arrow A so as to bring a pinion gear portion 60 thereof into position for meshed engagement with a second pinion gear 62 which is operably in mesh with the zoom ring gear 32. Gear 62 is journalled on a shaft 64. Thus, lever 56 may be moved back and forth to selectively transmit torque through the aforesaid gear assembly from the motor to either of the ring gears 30 or 32.

The distance determining mechanism of the present invention, in its exemplary form, includes a mercury switch, generally designated 66, which has a tubular portion 68 within which is housed a quantity or "glob" of mercury 70. The tubular portion 68 is elongated in a plane generally parallel to the objective axis 20 and is supported snap-fit within three arm portions 72 of a bracket 74 (FIG. 2) which is pivotally mounted to a support plate 76 by means of pin 78. Pin 78 defines the pivot axis of the mercury switch, the axis extending generally perpendicular to and above the objective axis 20. Plate 76 is fixed to a rigid bar support 80. Bar support 80 may be part of or fixed to a support piece 80a shown in dotted lines in FIG. 2 (not shown in FIG. 1 to facilitate the illustration).

The mercury switch 68 has two pairs of contacts 82a and 82b disposed at opposite ends of the tubular portion 68 thereof so that when the mercury 70 is disposed at either extreme opposite end of the tubular portion, a circuit closure condition is created through the mercury from one adjacent contact to the other at the respective end of the tube where the mercury is disposed. Thus, it is apparent that tilting the front of the camera (e.g., downwardly from the position shown in FIG. 1) to establish the hypotenuse side of the aforementioned hypothetical triangle will cause the mercury switch to assume circuit closure condition and actuate the motor 22 for driving the objective lens assembly to focusing condition by transmitting torque from the motor to the ring gear portion 30 of the focusing ring 28, as described above.

In order to establish a circuit breaking condition for de-energizing the motor 22 when the objective lens 18 is in focused condition, cam means is provided between the focusing ring 28 and the tubular portion 68 of the mercury switch. More particularly, a generally spiral cam slot 84 is provided about a portion of the focusing ring 28. A cam follower pin 86 protrudes from the switch bracket 74 through an arcuate aperture 88 in mounting plate 76 and into the cam slot 84. Thus, as the focusing ring 28 rotates in either direction, one side of the cam slot 84 will bear against the follower pin 86 (depending upon which direction the focusing ring is rotated) so as to pivot the mercury switch tube 68 about its axis defined by pin 78. Once the mercury switch tube is brought back to a horizontal position as shown in FIG. 3 (while the lens assembly is still canted downwardly) to establish a circuit breaking condition between the mercury 70 and the contacts 82a, the motor 22 is de-energized to establish the focused condition for the objective lens. A cut-out switch, described below, may be employed to render the mercury switch ineffective so that the camera may be tilted back to the horizontal position for picture taking purposes.

Obviously, the side of the mercury switch comprising the contacts 82b controls the focusing ring 28 in the same manner described above except that it operates only when the camera is tipped backwards or horizontally from whatever previous position at which it happened to be stopped.

With the two-sided switch described above, the motor 22 should be a reversible motor so that the mercury switch is effective to establish circuit closure conditions to drive the focusing ring in selectively reversible opposite directions. FIG. 4 shows a circuit diagram where it can be seen that the mercury switch is wired so as to determine the direction of current to the motor 22 through battery means, generally designated 90. A cut-out switch, generally designated 92, is placed in line with the motor 22 to render the mercury switch ineffective once the focused condition of the camera is established. The switching arrangement may be placed anywhere on the camera for manual manipulation.

It also should be pointed out that a conductive ball or the like may be utilized instead of the exemplary mercury substance 70.

The foregoing detailed description has been given for clearness of understanding only and no unnecessary limitations should be understood therefrom as some modifications will be obvious to those skilled in the art.

I claim:

1. In an optical instrument including a housing, focusable objective lens assembly having an optical axis and being supported by said housing, a motor for driving said lens assembly to focusing conditon, and normally incomplete circuit means including switch means connected to said motor and mounted for movement in response to the angular orientation of the optical instrument between a normally "open" position wherein the circuit means is incomplete and a "closed" position wherein said circuit means is complete for driving the lens assembly, the improvement in said switch means comprising:

a mercury switch including an elongated enclosure mounted on said housing for movement relative thereto, liquid mercury received within said enclosure and contact means disposed within said enclosure for electrical contact by said mercury, wherein angular movement of said enclosure causes said mercury to move into and out of connecting engagement with said contact means defining said closed and open positions;

a focusing ring rotatably mounted on said housing generally concentric with the axis of the objective lens assembly;

cam means operatively associating said focusing ring and said enclosure for rotating the enclosure about an axis generally perpendicular to said optical axis in response to rotating said focusing ring, said cam means including a generally spiral-shaped slot in said focusing ring and a pin on said enclosure protruding into said slot.

2. A combination according to claim 1 wherein said motor rotates said enclosure when said contact means are electrically connected by said mercury.

3. A combination according to claim 1 wherein said motor is reversibly driven, said contact means including a pair of contacts at each end of said enclosure for electrical connection by said mercury, the electrical connection of each pair of contacts completing said circuit means defining two "closed" positions so that the motor and lens assembly will be driven in one direction when one pair of contacts are connected and in the other direction when the other pair of contacts are connected.

* * * * *